United States Patent [19]

Koishi et al.

[11] Patent Number: 4,945,224

[45] Date of Patent: Jul. 31, 1990

[54] OPTICAL WAVEFORM OBSERVING APPARATUS

[75] Inventors: Musubu Koishi; Etsuo Tsujimura; Motoyuki Watanabe; Yutaka Tsuchiya, all of Shizuoka, Japan

[73] Assignee: Hamamatsu Photonics Kabushiki Kaisha, Shizuoka, Japan

[21] Appl. No.: 291,825

[22] Filed: Dec. 29, 1988

[51] Int. Cl.$^5$ .............................................. H01J 31/50
[52] U.S. Cl. .............................. 250/213 VT; 313/529
[58] Field of Search ................ 250/213 VT; 313/529, 313/537

[56] References Cited

U.S. PATENT DOCUMENTS

| 4,645,918 | 2/1987 | Tsuchiya et al. | 250/213 VT |
| 4,694,154 | 9/1987 | Tsuchiya et al. | 250/213 VT |
| 4,740,685 | 4/1988 | Koishi | 250/213 VT |
| 4,801,796 | 1/1989 | Kinoshita et al. | 313/529 |

FOREIGN PATENT DOCUMENTS 55-29787 3/1980 Japan.
2133875B 5/1986 United Kingdom.

OTHER PUBLICATIONS

Tsuchiya, Y. et al., "High Speed Photography, Videography, and Photonics V", Proceedings of the SPIE, vol. 832, pp. 227-234, Aug. 1987.

Primary Examiner—David C. Nelms
Assistant Examiner—K. Shami
Attorney, Agent, or Firm—Finnegan, Henderson, Farabow, Garrett and Dunner

[57] ABSTRACT

Optical waveform observing apparatus including a sampling streak tube to which is applied an incident light beam having a waveform to be observed. An electron beam corresponding to the incident light beam is repetitively deflected in the streak tube, in response to a repetitive deflecting trigger signal, to sample the electron beam. The repetitive deflection of the electron beam is periodically stopped for a first time period. An integration circuit integrates data outputted by the streak tube. A subtraction circuit subtracts the integration of streak tube data outputted during the first time period from the integration of streak tube data outputted during a second time period when the repetitive beam deflection is not stopped, so that background noise and dark currents are not included in the subtraction result.

18 Claims, 7 Drawing Sheets

OPTICAL WAVEFORM OBSERVING APPARATUS

BACKGROUND OF THE INVENTION

1. Field of the Invention

The invention relates to optical waveform observing apparatus for observing the waveform of an incident light beam.

2. Description of the Prior Art

One example of conventional means for observing the waveform of an optical pulse having a constant repetitive frequency is an optical waveform observing apparatus of the type including a streak tube used to convert the variation with time of an optical pulse into a luminance distribution, such as a streak image on a fluorescent surface.

Figure 3:
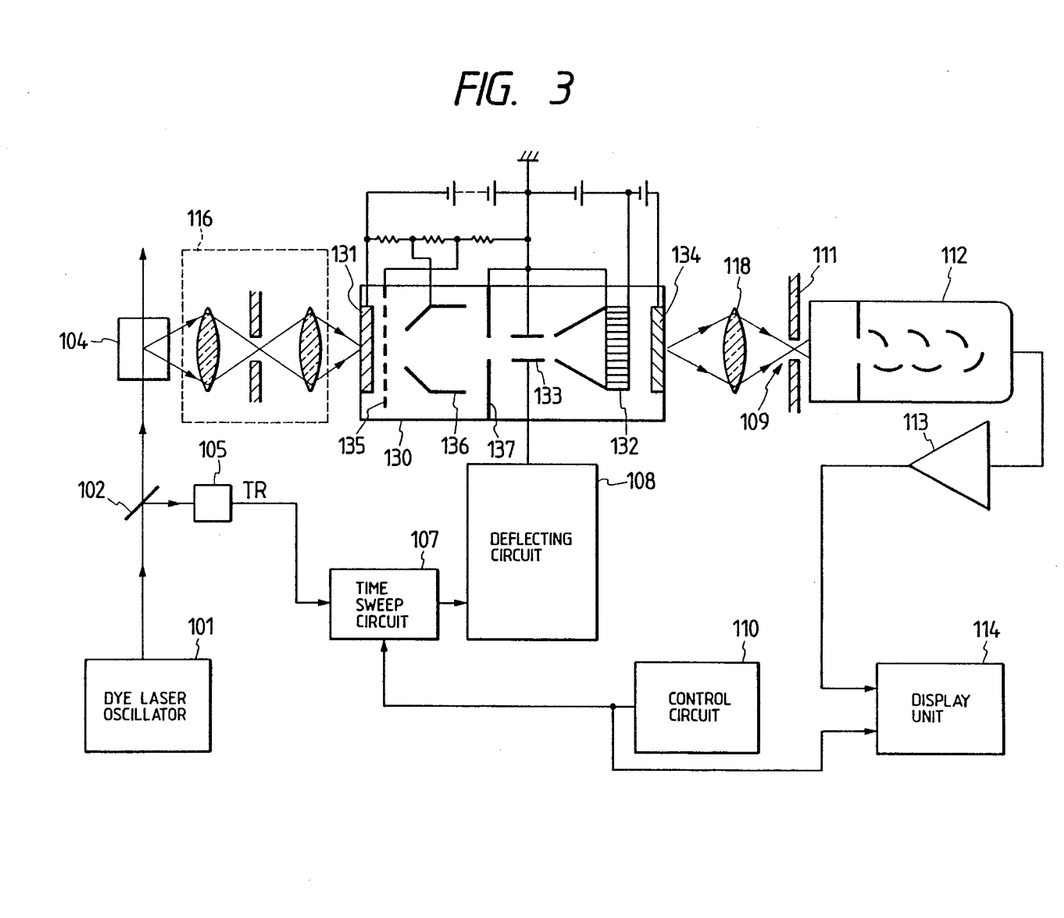
FIG. 3 is a diagram showing the arrangement of a conventional optical waveform observing apparatus.

FIG. 3 is a block diagram showing the arrangement of a conventional optical waveform observing apparatus as disclosed in U.S. Pat. No. 4,645,918. In that apparatus, a hematoporphyrin derivative 104 is excited with a pulsed light beam repetitively outputted by a dye laser oscillator 101 and emits fluorescence having a waveform that is observed with a streak tube 130. Streak tube 130, as shown in FIG. 3, comprises a photocathode 131 for receiving the fluorescence, an accelerating electrode 135 for accelerating an electron beam outputted by the photocathode 131, a focusing electrode 136 for focusing the electron beam accelerated by the accelerating electrode 135, an aperture electrode 137, deflecting electrodes 133 for deflecting in a sweep mode the electron beam that has been focused by focusing electrode 136 and passed through aperture electrode 137, a microchannel plate 132 for multiplying the deflected electron beam, and a phosphor screen 14, to which the output electron beam of the microchannel plate 132 is applied.

The pulsed light beam repetitively outputted by the dye laser oscillator 101 is divided into two pulsed light beams by a beam splitter 102. One of the two pulsed light beams excites the hematoporphyrin derivative 104 repetitively. The fluorescence emitted by derivative 104 is applied through an optical system 116 to the photocathode surface 131 of the streak tube 130 at a certain repetitive frequency. The other pulsed light beam is applied to a photodiode 105 to form an electrical signal TR for a predetermined deflecting voltage that is applied to the deflecting electrodes 133 in streak tube 130. More specifically, the pulsed light beam is subjected to photo-electric conversion by the photodiode 105 to form the electrical signal TR. The electrical signal TR, being delayed by a time sweep circuit 107 under the control of a control unit 110, is converted into a deflecting trigger signal that is applied to a deflecting circuit 108. Circuit 108 in turn produces a deflecting voltage in synchronism with the deflecting trigger signal.

With respect to the streak tube 130, the output electron beam of the photocathode 131 is deflected by the deflecting voltage applied across the deflecting electrodes 133 in the sweep mode, so that the variation with time of the fluorescence applied to the photocathode 131 is converted into a spatial luminance distribution on The phosphor screen 134, i.e., it is observed as a streak image. In the optical waveform observing apparatus of FIG. 3, the light of the luminance distribution on the phosphor screen 134, i.e., the light of the streak image, is applied through a lens 118 to a sampling board 111 with a slit 109, so that it is sampled by slit 109 to provide a sampling waveform. The sampling waveform is applied to a photomultiplier 112 that subjects it to photoelectric conversion and multiplication. The output of the photomultiplier 112 is applied through an amplifier 113 to a display unit 114.

The operation of the optical waveform observing apparatus thus organized will be described with reference to FIG. 4 which is a time chart consisting of parts (a) through (e).

In response to the pulsed light beam repetitively outputted by the dye laser oscillator 101, the hematoporphyrin derivative 104 outputs fluorescence with a repetitive period. This is indicated in part (a) of FIG. 4 which shows the waveform of an incident light beam "IN" that is applied to the photocathode 131 of the streak tube 130. Also in response to the pulsed light beam of dye laser oscillator 101, the photodiode 105 outputs the electrical trigger signal TR as shown in part (b) of FIG. 4. As is apparent from parts (a) and (b) of FIG. 4, the electrical trigger signal TR is completely synchronized with the incident light beam IN. The electrical trigger signal TR is gradually delayed by time sweep circuit 107 as shown in part (c) of FIG. 4, and converted into the deflecting trigger signal. Under the control of the control circuit 110, the time sweep circuit 107 forms a sampling sequence type deflecting trigger signal that allows a sampling operation at a sampling time, the next sampling operation at the next sampling time, and so on. As shown in part (c) of FIG. 4, at the n-th sampling time, the deflecting trigger signal TR; at the (n+1)-th sampling time, the deflecting trigger signal TR2 is delayed by a period of time (n+1)·t; at the (n+2)-th sampling time, the deflecting trigger signal TR3 is delayed by a period of time (n+2)t; and so forth, where t is the unitary delay time of the deflecting trigger signal.

Figure 4:
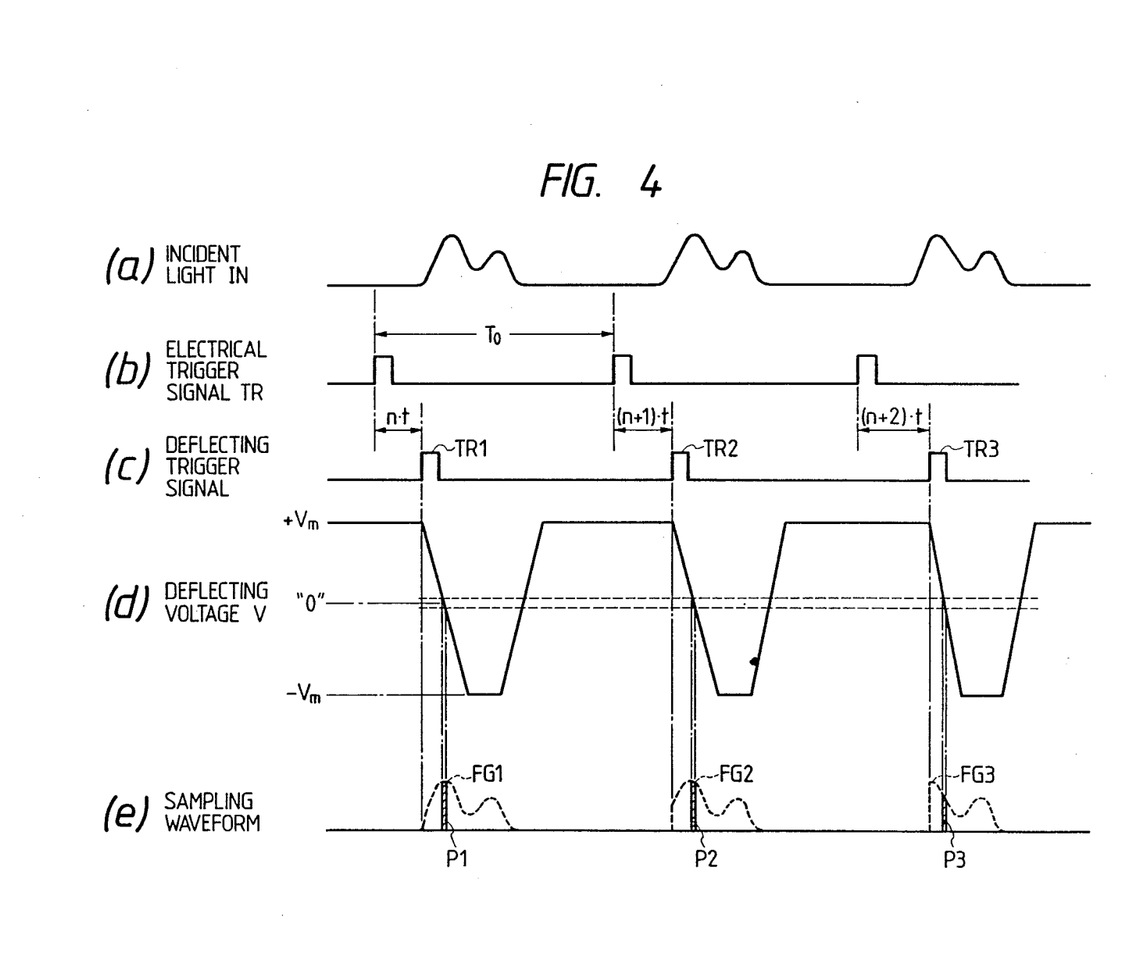
FIGS. 4(a), 4(b), 4(c), 4(d) and 4(e) are time charts respectively showing an incident light beam IN, an electrical trigger signal TR, a deflecting trigger signal, a deflecting voltage V, and a sampling waveform.

When the deflecting trigger signals are applied to deflecting circuit 108, the latter produces the deflecting voltage V as shown in part (d) of FIG. 4. As is apparent from part (d) of FIG. 4, the deflecting voltage V is maintained at a potential $V_m$ when it is not used to deflect the output electron beam of the photocathode 131. However, when the deflecting trigger signal is applied to deflecting circuit 108, the deflecting voltage drops to a potential $-V_m$ substantially with a ramp characteristic, to deflect the electron beam. Whenever the deflecting voltage is decreased in the above-described manner, the electron beam is deflected downwardly, as a result of which it is observed as streak images FG1, FG2, FG3, . . . at the sampling times as shown in part (e) of FIG. 4. As a result, the variation in intensity of the incident light beam IN can be observed as a luminance distribution. As seen from parts (a) and (e) of FIG. 4, the streak images FG1, FG2, FG3, . . . reflect the respective incident light beams IN. The streak images are shifted in phase from one another, however, because the deflecting voltages at the sampling times are shifted in phase from one another. When, during the electron beam deflecting operation, the deflecting voltage is near zero (0) volts, the electron beam 20 not deflected and reaches the central portion of the phosphor screen 134, which portion emits a light beam. Most of the light beam thus emitted passes through the slit 109 of the sampling board 111, so that it is detected as a sampling signal by the photomultiplier 112. That is, referring to part (e) of FIG. 4, at the respective n-th, (n+1)-th and (n+2)-th sampling times, sampling signals P1, P2 and P3 are extracted by slit 109 of sampling board 111 and detected by the photomultiplier 112.

The sampling signals P1, P2, P3, ... are detected in a time-series mode and are combined, as a result of which one pulse waveform of the incident light beam IN having the repetitive frequency can be observed with a predetermined time resolution.

Figure 5:
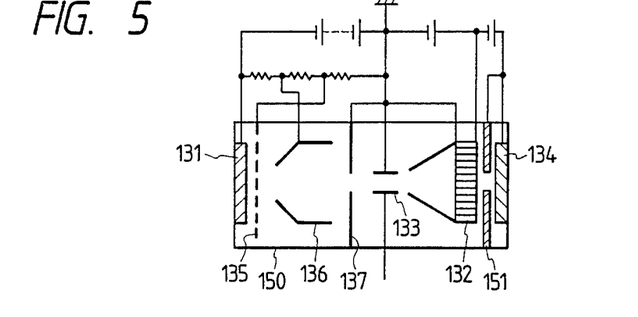
FIG. 5 is a diagram showing the arrangement of a conventional sampling streak tube.

In the case of FIG. 3, the sampling board 111 with the slit 109 is provided outside of the streak tube 130. However, as shown in FIG. 5, the sampling board may be provided inside the streak tube. That is, the sampling board may be arranged between the micro-channel plate 132 and the phosphor screen 134. In the streak tube 150 shown in FIG. 5, a sampling electrode 151 is provided therein and held at the same potential as the phosphor screen 134. The streak tube having the sampling electrode inside it is generally referred to as "a sampling streak tube."

With respect to the sampling streak tube, the sampling waveform can be extracted before the electron beam reaches the phosphor screen 134. Therefore, unlike the apparatus shown in FIG. 3 in which the electron beam is applied to phosphor screen 134 throughout the sweep operation, in an optical waveform observing apparatus with the sampling streak tube, the necessary electron beam is applied only to the central portion of phosphor screen 134, and only a part of the luminance distribution is applied to the photomultiplier 112. As a result, the sampling waveforms detected are less affected by the background noises of the phosphor screen.

Figure 6A:
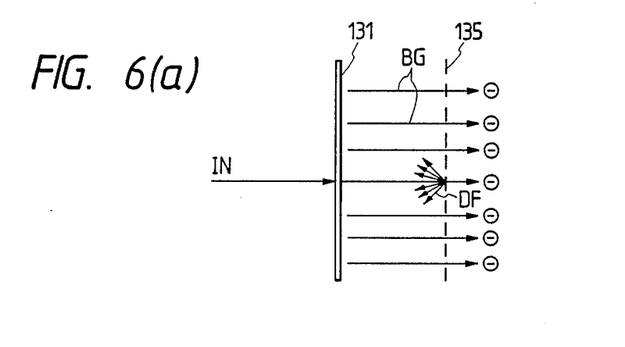
FIG. 6(a) and 6(b) are, respectively, an illustration of the interception of photoelectrons due to scattered light beams in the case where a mesh-shaped accelerating electrode is employed and an electron density distribution diagram for a sampling electrode in the same case.

In the streak tube 130 shown in FIG. 3, or in sampling streak tube 150 shown in FIG. 5, the accelerating electrode 135 is a circular mesh accelerating electrode and, therefore, the electron beam passing through the accelerating electrode 135 includes background noises. The mesh opening percentage of the accelerating electrode 135 is generally 60%. As shown in part (a) of FIG. 6, about 40% of the incident light beam which, not being subjected to photoelectric conversion by the photocathode 131, has passed therethrough, is scattered by the mesh material, to form scattered light beams DF. The scattered light beams DF thus formed are applied to photocathode 131 from behind and cause the photocathode to emit photoelectrons BG that represent the background noises.

Figure 6B:
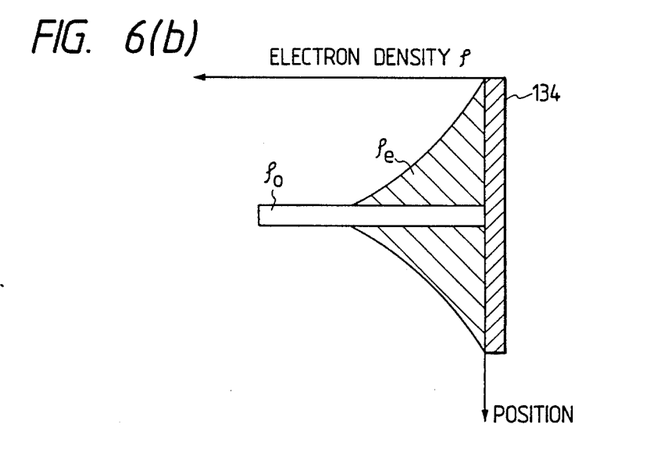

Part (b) of FIG. 6 shows the density distribution of the electrons that reach the sampling electrode 151 in the streak tube 150. As is apparent from part (b) of FIG. 6, in the case where the accelerating electrode 135 is a mesh electrode, the electron density distribution $\rho_o$ and a scattered light beam photoelectron density distribution $\rho_e$. The latter density distribution $\rho_e$ represents the background noises and lowers the sampling waveform observation accuracy. As seen from the density distribution $\rho_e$, the photo electrons BGT, due to the scattered light beams, are greatest in number at the central portion of the phosphor screen to which the incident light beam is applied, and fewer in number towards the periphery of the phosphor screen. The substantial number of scattering electrons around the incident light beam thus lowers the measurement accuracy. As a result, it is difficult to accurately measure a light pulse waveform with high time resolution, since background noises due to the scattered light beams DF are produced before and after the measured light pulse.

The background noises as represented by the density distribution $\rho_e$ are spread over a wide range. As a result, during a non-sweep standby period, while the incident light beam is applied to the photocathode 131, the noise electrons of density distribution $\rho_e$ will be sampled with high probability. Accordingly, those noise electrons should be eliminated. For this purpose, in the conventional optical waveform observing apparatus, the deflecting voltage V applied by the deflecting circuit 108 is made large in amplitude and high in through rate (voltage/time). This can lower the probability that, during the electron beam deflection, the photoelectrons attributable to the scattered light beams are sampled.

As the amplitude of deflecting voltage V is made large, the potential $V_m$ of the deflecting voltage V is large during the non-sweep stand by period. Therefore, even if the incident light beam is applied to the photocathode 131, the signal electrons attributable to the incident light beam are greatly deflected by the deflecting electrode 133 and reach a peripheral portion of the phosphor screen 134 that is remote from the central portion. As a result, even if the density distribution $\rho_e$ of the photo electrons due to the scattered light beams is spread over a wide range, the probability that these photoelectrons reach the central portion of phosphor screen 134 is small and, accordingly, their effect on the sampling waveform is eliminated.

With respect to the sampling streak tube 150 shown in FIG. 5, the potential $V_m$ of the deflecting voltage V is made large enough so that, during the non-sweep stand by period the electron beam reaches a portion of the sampling electrode 151 that is remote from the slit. Accordingly, in this case also, the sampling waveform is protected from being affected by the photoelectrons caused by the scattered light beans. In practice, the potentials $V_m$ and $-V_m$ of the deflecting voltage V are about +1 KV and −1 KV, respectively.

In the optical waveform observing apparatus in which the waveform of an incident light beam is observed by sampling, an aperture time $\Delta t$ in which the sampling waveform is extracted in determined by a sweeping velocity $V_t$ at which the electron beam emitted from the photocathode 131 in response to the incident light beam is deflected to sweep across the slit of the sampling electrode, a diameter u of the electron beam, and a slit width w of sampling electrode 151. The aperture time $\Delta t$ corresponds to the time resolution and is represented by the following equation (1):

$$\Delta t = \sqrt{(u^2 + W^2)} / V_t \qquad (1)$$

The sweeping velocity $V_t$ can be represented by the following equation (2):

$$V_t = S \times T$$

where S is the deflection sensitivity (cm/V) of the sampling streak tube 150, and T is the through rate (V/sec) of the deflecting voltage.

As is apparent from equation (1) and (2), the aperture time $\Delta t$ is decreased as the deflection sensitivity S and/or the deflecting voltage through rate T increase, with the result that the time resolution is improved.

However, the conventional optical waveform observing apparatus experiences difficulties when the distance between the pair of deflecting electrodes 133 is decreased for improvement of the deflection sensitivity S. Since the deflecting voltage $V_m$ has been made large in amplitude for the reasons described above, the greatly deflected electron beam will, during the non-sweep stand by period, strike against and be reflected by the deflecting electrodes and the reflected beam will travel to the central portion of the phosphor screen 134. Accordingly, in the conventional optical waveform observing apparatus, it is impossible to greatly reduce the distance between the pair of deflecting electrodes 133. That is, the possible improvement to the deflection sensitivity S is limited. As a result, it is impossible to obtain a time resolution on the order of several picoseconds and, further, it is also impossible to increase the repetitive frequency of the deflection.

The above-described difficulties are eliminated by an apparatus disclosed in Japanese patent application No. 163535/87 entitled "Optical Waveform Observing Apparatus". A corresponding U.S. patent application Ser. No. 291,893 was filed on 12/29/88. This apparatus disclosed in those applications is as shown in FIG. 7.

Figure 7:
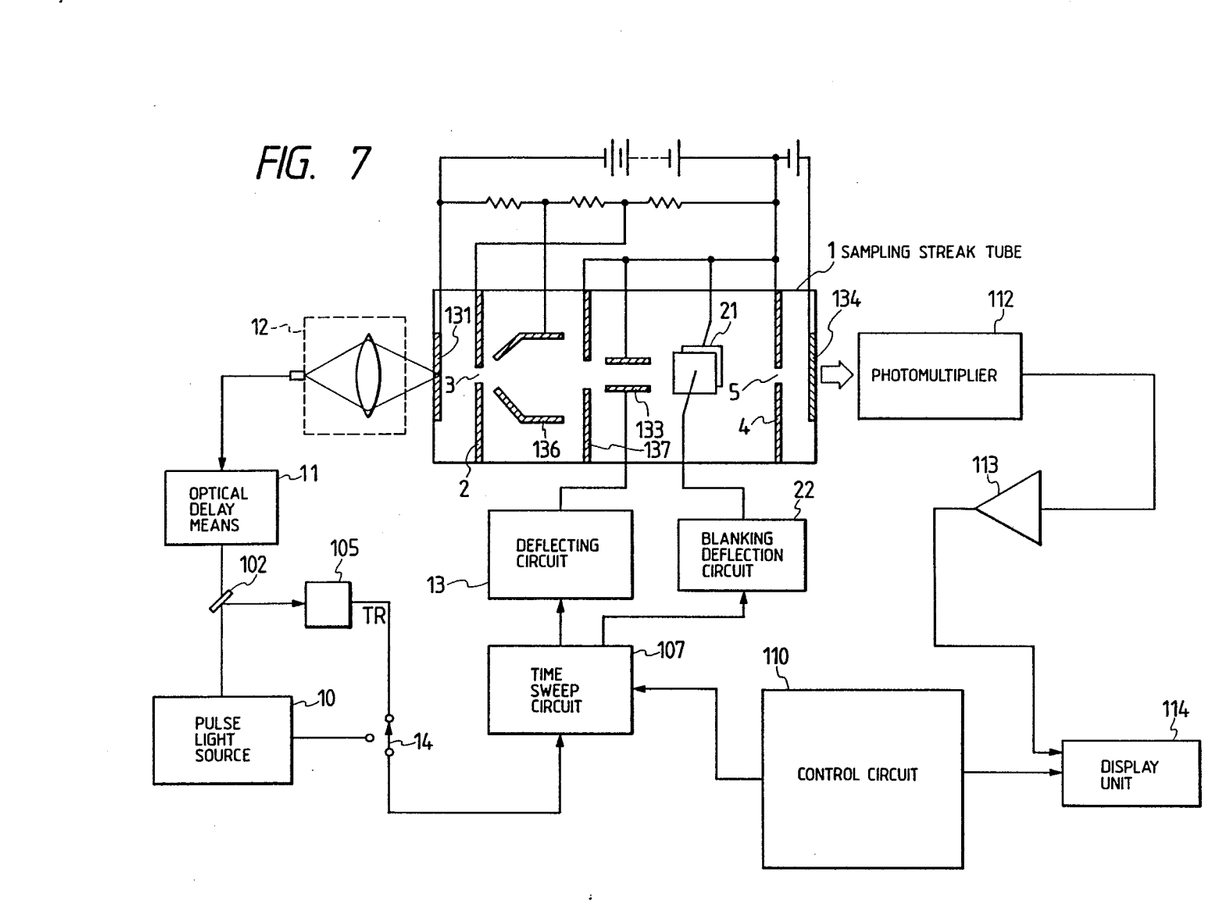
FIG. 7 is a diagram showing the arrangement of an optical waveform observing apparatus.

In the optical waveform observing apparatus of FIG. 7, a sampling streak tube 1 comprises a photocathode 131 to which an incident light beam is applied, an accelerating electrode 2 for accelerating the electron beam emitted from the photocathode, deflecting electrodes 133 for deflecting in a predetermined direction the electron beam passed through the accelerating electrode 2, a sampling electrode 4 for sampling the electron beam deflected by the deflecting electrodes 133, and phosphor screen 134 for detecting the electron beam sampled by a slit 5 of the sampling electrode 4. Accelerating electrode 2 is in the form of a plate having an opening 3. Blanking deflecting electrodes 21 are interposed between sampling electrode 4 and deflecting electrodes 133 so that during a flyback period of the deflecting electrodes 133, the electron beam may not be sampled. The incident light beam applied to the photocathode 131 of the sampling streak tube 1 is a light pulse having a repetitive frequency whose waveform is to be observed. The light pulse is outputted by a pulsed light source 10 and is applied through a beam splitter 102, optical delay means 11, and an input optical system 12 to the photocathode 131.

In similar fashion to the beam splitter in the conventional optical waveform observing apparatus, the beam splitter 102 splits the incident light beam outputted by the pulsed light source 10 into two parts, one of which is applied to a photodiode 105, where it is converted into a deflecting trigger signal TR. Also, in similar fashion to the conventional apparatus, the delayed deflecting trigger signal TR is applied to a time sweep circuit 107, where it is gradually delayed so that the sampling operation is carried out once every sampling time as was described above. The delayed deflecting trigger signal TR is applied to a deflecting circuit 13 and a blanking deflecting circuit 22.

Photodiode 105 is used to form the electrical trigger signal TR by photo-electric conversion. However, a drive signal for pulsed light source 10 may be employed as the electrical trigger signal TR by operating a switch 14.

In the optical waveform observing apparatus constructed as illustrated in FIG. 7, The plate-shaped accelerating electrode 2 with opening 3 is employed and, therefore, the photoelectrons due to the scattered light beams are blocked by the solid (not opened) portion of the accelerating electrode. As a result, the probability that the photoelectrons are mixed with the signal electrons, thus providing background noises, is greatly reduced. Therefore, when the amplitude of the deflecting voltage applied across the deflecting electrodes 133 is reduced, the background noises caused by the incident light beam applied during the non-sweep stand by period are quite small. Accordingly, the probability that the background noises are sampled by the slit 5 of the sampling electrode 4 is reduced. Thus, the deflecting voltage applied to deflecting electrodes 133 can be made small in amplitude and the distance between deflecting electrodes 133 can be decreased, as a result of which the deflection sensitivity is improved and the deflecting repetitive frequency can be increased.

With respect to the optical waveform observing apparatus shown in FIG. 7, as a result of a employing plate-shaped accelerating electrode 2 with opening 3, the probability that the background noises caused by the photo electrons due to the scattered light beams being sampled during the non-sweep stand by peiod when the deflecting voltage V is at $V_m$, is reduced to about $10^{-6}$ of the probability that the signal electron peak value is sampled. As a result, the deflection repetitive frequency can be made as high as about 4 MHz and, accordingly, the waveform of an incident light beam high in repetitive frequency can be observed.

In the case where the incident light beam repetitive frequency is much higher that the deflection repetitive frequency, e.g., on the order of 4 GHz, the frequency of application of the incident light beam to photocathode 131 of the sampling streak tube 1 during the non-sweep stand by period is quite high, and the background noises produced are substantially in proportion to that frequency.

Figure 8:
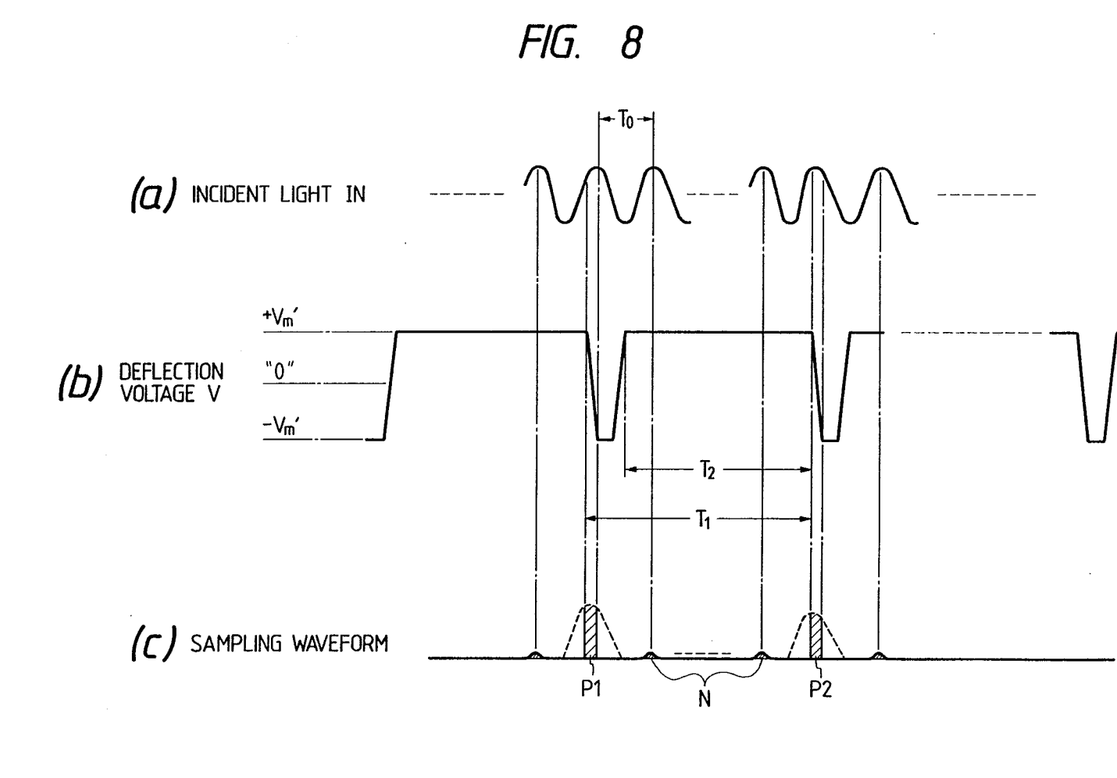
FIGS. 8(a), 8(b) and 8(c) are time charts respectively showing an incident light beam IN, a deflecting voltage V, and a sampling waveform.

Parts (a), (b) and (c) of FIG. 8 are time charts corresponding to the operation of the apparatus illustrated in FIG. 7 when the incident light beam repetitive frequency is much higher than the deflection repetitive frequency, such as described above. Specifically, parts (a), (b) and (c) of FIG. 8 are time charts showing the incident light beam IN, the deflecting voltage V, and the sampling waveform, respectively.

When, as shown in parts (a) and (b) of FIG. 8, the repetitive period $T_1$ of the deflecting voltage V is much longer than the period $T_0$ of the incident light beam IN, the deflection of the incident light beam IN is carried out once every $T_1/T_0$ times. As a result, the sampling waveforms P1 and P2 are extracted with timing as shown in part (c) of FIG. 8. During the period $T_2$ in which the deflection, i.e., the sweep, is not carried out, the deflecting voltage v is held at $V_m'$ and the incident light beam IN is applied to the photocathode 131 of the sampling streak tube 1 about $T_1/T_0$ times. The resultant background noises are extracted as sampling waveforms N as shown in part (c) of FIG. 8. That is, the sampling waveforms N are observed $T_1/T_0$ times during the non-sweep stand by period. The magnitude of the background noise due to sampling waveforms N is much smaller than that of the signal electron sampling waveforms P1 and P2, being on the order of $10^{-6}$ of the latter. However, the integration of the former is $(T_1/T_0) \times 10^{-6}$, which is so large that is cannot be disregarded with respect to the magnitude of the signal electron sampling waveforms P1 and P2.

A numerical example to illustrate this problem associated with background noise is described next. In the case where the repetitive frequency of the incident light beam IN is about 4 GHz and the repetitive frequency of the deflecting voltage is 4 MHz, the waveform of the incident light beam is deflected once every 1,000 applications of the incident light beam IN and sampled. However, the incident light beam is applied to the photocathode 131 of the sampling streak tube 999 times during the non-sweep stand by period during which no deflection is carried out. In this case, the integration of the background noise due to the sampling waveforms is on the order of $10^{-3}$ $(=999\times10^{-6})$ and it cannot be disregarded when high accuracy observations are to be performed.

In the case where the incident light beam is a continuous wave light beam, the background noises will greatly affect the signal electrons. If, in such a case, the aperture time (time resolution) is 10 psec (picoseconds) and the deflection repetitive frequency is 4 MHz (the repetitive period being 250 nanoseconds), then the integration of the background noise sampling waveforms N is about $0.025=(250\times10^{-9}/10\times10^{-12})\times10^{-6}$ of the signal electron peak value. This value cannot be disregarded when performing high accuracy observations.

In addition to the background noises resulting from the photo electrons caused by scattered light beams, the dark current of the photocathode 131 of sampling streak tube 1 and that of the photocathode of the photomultiplier 112 may adversely affect the accuracy of observation.

SUMMARY OF THE INVENTION

An object of the invention is to provide an optical waveform observing apparatus in which the adverse effects of background noises caused by the photoelectrons due to the scattered light beam, and of the dark current described above, are minimized so that optical wave observation data can be obtained with high accuracy.

To achieve the above and other objects and in accordance with the purpose of the invention, as embodied and described herein, the invention comprises optical waveform observing apparatus including a sampling streak tube for observing a waveform of an incident light beam, the streak tube including means responsive to a repetitive deflecting trigger signal for deflecting in a sweep mode an electron beam corresponding to the incident light beam so that the electron beam can be sampled. The apparatus comprises means for generating an electrical trigger signal having a repetitive frequency, time sweep means for delaying by a predetermined time period the electrical trigger signal to provide the deflecting trigger signal, integration means for integrating data outputted by the streak tube, control means, operatively coupled to the time sweep means, for periodically generating a stop signal causing the time sweep means to suspend provision of the deflecting trigger signal for a first time period, and subtraction means, operatively coupled to the integration means, for subtracting the integration of the streak tube data outputted during the first time period from the integration of the streak tube data outputted during a second time period when the deflecting trigger signal is provided.

The accompanying drawings, which are incorporated in and constitute a part of this specification, illustrate embodiments of the invention and together with the description, serve to explain the principles of the invention.

DESCRIPTION OF THE PREFERRED EMBODIMENT

Figure 1:
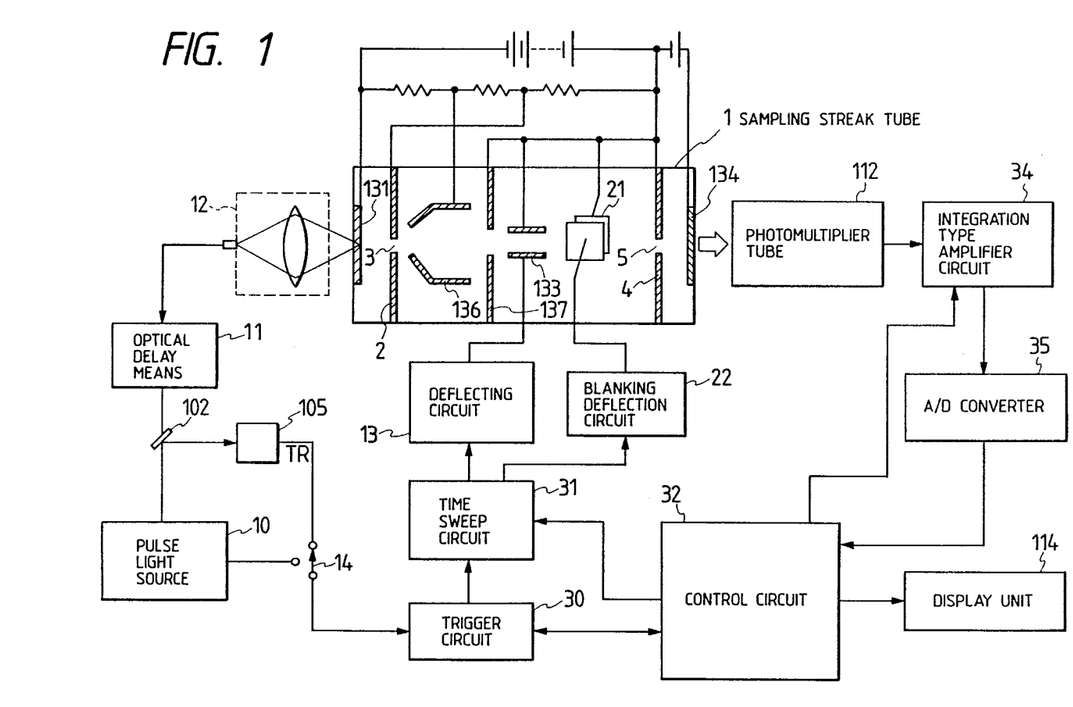
FIG. 1 is a diagram showing the arrangement of one example of an optical waveform observing apparatus according to the present invention.

FIG. 1 shows the arrangement of one example of an optical waveform observing apparatus according to the present invention. In FIG. 1, parts corresponding functionally to those that have already been described with reference to FIG. 7 are designated by the same reference numerals, and the preceding description is applicable.

In accordance with the invention as embodied in the optical waveform observing apparatus shown in FIG. 1, immediately after a sampling operation is carried out a predetermined number of times, the sweep of the electron beam is suspended. Further, data on the background noises caused by photoelectrons due to scattered light beams, data on the dark current of photocathode 131 of sampling streak tube 1, and data on the dark current of the photocathode of the photomultipler 112 are obtained for the same period of time as data was obtained by the sampling operation. Then, the data on the background noises and dark currents is subtracted from the data obtained by the sampling operations to eliminate the adverse effect of the background noises and dark currents.

The optical waveform observing apparatus of the invention as embodied in FIG. 1 comprises sampling streak tube 1, a trigger circuit 30 that counts the number of times of rise, i.e., occurrences, of the electrical trigger signal TR, determines the repetitive frequency and applies the resultant count data (including determined frequency) to a control circuit 32, and a time sweep circuit 31 that, under the control of control circuit 32, operates to delay for a predetermined time period the electrical trigger signal TR applied thereto by trigger circuit 30 to form a deflecting trigger signal. Time sweep circuit 31 is further controlled by control circuit 32 to suspend the outputting of the deflecting trigger signal TR for a predetermined time period after a predetermined number of deflecting trigger signals TR have been outputted. Further, for the purpose of repeatedly and continuously sampling the same part of the waveform of the incident light beam, time sweep circuit 31 also operates to stepwise change the delay time of the deflecting trigger signal whenever a predetermined number of sampling operations is achieved.

Further, with respect to the observing apparatus shown in FIG. 1, photomultiplier 112 is connected to an integration type amplifier circuit 34. Amplifier circuit 34 operates to integrate the output current of photomultiplier 112 for a predetermined period of time, to form a voltage that is applied to an A/D (analog-to-digital) converter 35. A/D converter 35 converts the sampling data analog integration provided by integration type amplifier circuit 34 into a digital integration that is applied to control circuit 32.

The operation of the optical waveform observing apparatus illustrated in FIG. 1 is described with reference to the time charts shown in parts (a) through (d) of FIG. 2.

Figure 2:
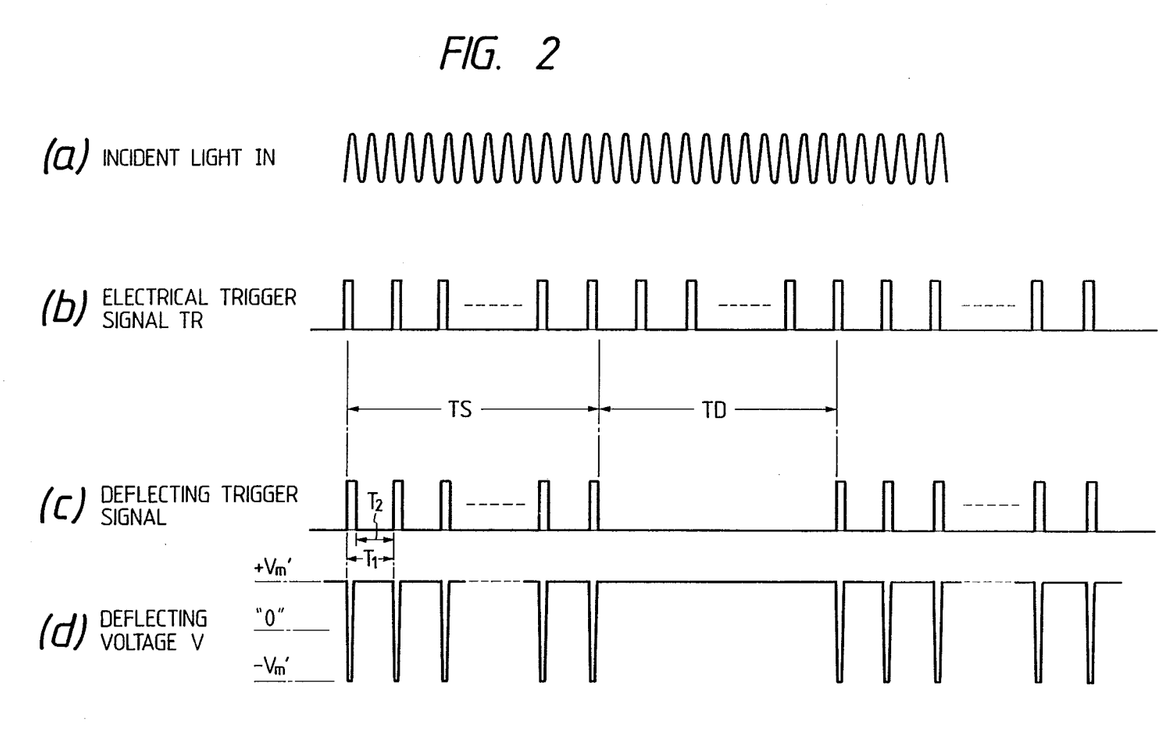
FIGS. 2(a), 2(b), 2(c) and 2(d) are time charts respectively showing an incident light beam IN, an electrical trigger signal TR, a deflecting trigger signal, and a deflecting voltage v.

The time charts in parts (a), (b), (c) and (d) of FIG. 2 respectively shown an incident light beam having a high repetitive frequency, electrical trigger signal TR, the deflecting trigger signal, and the deflecting voltage.

An incident light beam IN having a high repetitive frequency (for example 4 GHz such as shown in part (a) of FIG. 2) is applied to photocathode 131 of sampling streak tube 1 for the purpose of observing its waveform. The electrical trigger signal TR, whose frequency (for example 4 GHz) is synchronous with and less than the repetitive frequency of the incident light beam IN, is applied to trigger circuit 30. While the 4 MHz frequency of the electrical trigger signal TR is lower than the incident light beam IN repetitive frequency, it is the maximum frequency for the normal sampling operation in sampling streak tube 1.

When the electrical trigger signal TR is applied to trigger circuit 30, that circuit counts the number of occurrences of the electrical trigger signal TR, determines the repetitive frequency and applies the resultant count data to control circuit 32. At the same time, trigger circuit 30 transmits the electrical trigger signal TR to time sweep circuit 31. Under the control of control circuit 32, time sweep circuit 31 delays the electrical trigger signal by a predetermined period of time, to output a deflecting trigger signal as shown in part (c) of FIG. 2. Control circuit 32 calculates a period of time TS in accordance with the repetitive frequency and the number of occurrences of the electrical trigger signal provided by trigger circuit 30. During the time period, TS, control circuit 32 applies no stop signal to time sweep circuit 31 and causes circuit 31 to output the deflecting trigger signal delayed by the predetermined period of time.

After the lapse of time period TS, control circuit 31 applies a stop signal to time sweep circuit 31 for a period of time TD, thus stopping the outputting of the deflecting trigger signal. As a result, as shown in part (d) of FIG. 2, during the period TS that the deflecting trigger signals are outputted, the deflecting voltage V is provided by the deflecting circuit in synchronism with the deflecting trigger signals to carry out the sweeping operation. However, during the period TD, no deflecting trigger signal is outputted and the deflecting voltage V is held at $V_m'$ so that the sweeping operation is not carried out.

During the period of TS, the sweeping operation is performed as was described above, and part of the waveform of the incident light beam IN is repeatedly extracted and integrated, as sampling data, by integration type amplifier circuit 34, the output of which is applied through A/D converter 35 to control circuit 32. In accordance with operation during period TS, the deflecting voltage is held at $V_m'$ a substantial portion of the time (i.e. between successive sweeps) and, therefore, the resultant sampling data includes the background noises caused by the photoelectrons due to the scattered light beams and the dark currents formed during the period TS.

During the period TD, the deflecting voltage V is held at $V_m'$ and the sweeping operation is suspended. Therefore, with respect to operation during period TD, only data on the background noises caused by the photoelectrons due to the scattered light beams and the dark currents are integrated by integration type amplifier circuit 34, the output of which is applied through A/D converter 35 to control circuit 32. As is apparent from the above description, when control circuit 32 operates to make the periods TD and TS equal to each other, and to subtract the integration data of only the background noises and dark currents obtained during the period TD from the integration data obtained during the period TS, the resultant data is barely affected by the background noises and dark currents. As seen in FIG. 1, control circuit 32 provides the subtraction result data to display unit 114 for display.

With respect to determining the periods TS and TD, the period TD can be the period in which the deflecting trigger signal is produced 1,000 times.

Thus, in accordance with the optical waveform observing apparatus of the invention, the integration of the data obtained during the period that no deflecting trigger signal is outputted is subtracted from the integration of the sampling data obtained during the period that the deflecting trigger signal is provided repeatedly, so that the effect of the background noises and dark currents is effectively eliminated from the integrated sampling data and the resultant optical waveform observation data is high in accuracy.

In the above-described embodiment, the repetitive frequency of the incident light beam IN is much higher than the repetitive frequency of the electrical trigger signal TR. However, even in the case where the repetitive frequency of the incident light beam IN is lower than that of the electrical trigger signal TR, or the incident light beam is a continuous wave light beam, the effect of the background noise and dark currents can be minimized in the same manner.

In summary, in accordance with the optical waveform observing apparatus of the invention, the time sweep means delays the electrical trigger signal by a predetermined period of time, to provide the deflecting trigger signal, and the waveform of the incident light beam is observed by sampling it with the sampling streak tube in synchronism with the deflecting trigger signal. The integration of the data obtained during the period that the deflecting trigger signal is repeatedly outputted is affected by the background noises and dark currents provided during the non-sweep stand by periods, between successively outputted trigger signals, when sampling does not occur. In order to eliminate the effect of the background noises and dark currents from the integration of the sampling data, in the apparatus of the invention, the outputting of the deflecting trigger signal is suspended during a predetermined period, and the data of only the background noises and dark current are integrated during this predetermined period. If the period that the deflecting trigger signal output is suspended is made equal to the period that the deflecting trigger signal is repeatedly outputted, then the integration of the data of only the background noises and dark currents provided during the former period will equal the integration of data of the background noises and dark currents contained in the integration of the sampling data obtained during the latter period. Therefore, when those integrations are subjected to subtraction by subtraction means of control circuit 32, the effect of the background noises and dark currents is eliminated from the sampling data.

It is intended that the present invention cover the modifications and the variations of this invention provided they come within the scope of the appended claims and their equivalents.

What is claimed is:

1. Optical waveform observing apparatus comprising:
    a sampling streak tube for observing a waveform of an incident light beam, the streak tube including means responsive to a repetitive deflecting trigger signal for deflecting in a sweep mode an electron beam corresponding to the incident light beam so that the electron beam can be sampled;
    means for generating an electrical trigger signal having a predetermined repetitive frequency;
    time sweep means for delaying by a predetermined time period said electrical trigger signal to provide said deflecting trigger signal;
    integration means for integrating data outputted by said streak tube;
    control means, operatively coupled to said time sweep means, for periodically generating a stop signal causing said time sweep means to suspend provision of said deflecting trigger signal for a first time period; and
    subtraction means, operatively coupled to said integration means, for subtracting the integration of the streak tube data outputted during said first time period from the integration of the streak tube data outputted during a second time period when said deflecting trigger is provided.

2. The optical waveform observing apparatus of claim 1, wherein said first and second time periods are of equal duration.

3. The optical waveform observing apparatus of claim 1, wherein said electrical trigger signal is synchronized with the incident light beam waveform.

4. The optical waveform observing apparatus of claim 1, wherein said sampling streak tube includes:
    a photocathode responsive to the incident light beam to provide the corresponding electron beam;
    an accelerating electrode for accelerating the electron beam emitted by said photocathode, said accelerating electrode being in the form of a plate having an opening through which the electron beam passes; and
    deflecting electrodes, responsive to said deflecting trigger signal, for deflecting the electron beam for sampling.

5. The optical waveform observing apparatus of claim 4, wherein said sampling streak tube further includes blanking deflecting electrodes for deflecting the electron beam deflected by said deflecting electrodes such that the electron beam is not sampled during a flyback period of said deflecting electrodes.

6. The optical waveform observing apparatus of claim 1, wherein the output data of said streak tube is in analog form, and said integration means comprising an integration type amplifier circuit.

7. The optical waveform observing apparatus of claim 6, further including:
    photomultiplying means, responsive to a luminance distribution generated by said streak tube and corresponding to the sampled electron beam, for providing the streak tube data as an electrical output current;
    said integration type amplifier circuit being coupled to receive and integrate said output current for a third time period to provide the integration of streak tube data as a corresponding output voltage;
    analog-to-digital conversion means for converting said output current into a digital integration of said streak tube data; and
    said subtraction means subtracting the digital integrations of said streak tube data for said first and second time periods.

8. The optical waveform observing apparatus of claim 1, further including display means for displaying a result of subtracting the integration of streak tube data for the first and second time periods.

9. The optical waveform observing apparatus of claim 1, further including trigger means, coupled to receive said electrical trigger signal, for counting a number of occurrences of said electrical trigger signal and determining a repetitive frequency thereof; and
    said control means being coupled to receive from said trigger means as count data the number of trigger signal occurrences and the repetitive frequency thereof, said control means determining the duration of said first time period from said count data.

10. An optical waveform observing system, comprising:
    a sampling streak tube for observing a waveform of an incident light beam, said streak tube including means responsive to a repetitive deflecting trigger signal for deflecting in a sweep mode an electron beam corresponding to the incident light beam so that the electron beam can be sampled;
    means for generating an electrical trigger signal having a repetitive frequency;
    time sweep means for delaying by a predetermined time period said electrical trigger signal to provide said deflecting trigger signal;
    integration means for integrating data outputted by said streak tube;
    control means, operatively coupled to said time sweep means, for periodically generating a stop signal causing said time sweep means to suspend provision of said deflecting trigger signal for a first time period; and
    subtraction means, operatively coupled to said integration means, for subtracting the integration of the streak tube data outputted during said first time period from the integration of the streak tube data outputted during a second time period when said deflecting trigger signal is provided.

11. The optical waveform observing system of claim 10, wherein said first and second time periods are of equal duration.

12. The optical waveform observing system of claim 10, wherein said electrical trigger signal is synchronized with the incident light beam waveform.

13. The optical waveform observing system of claim 10, wherein said sampling streak tube includes:
    a photocathode responsive to the incident light beam to provide the corresponding electron beam;
    an accelerating electrode for accelerating the electron beam emitted by said photocathode, said accelerating electrode being in the form of a plate having an opening through which the electron beam passes; and deflecting electrodes, responsive to said deflecting trigger signal, for deflecting the electron beam for sampling.

14. The optical waveform observing system of claim 13, said sampling streak tube further including blanking deflecting electrodes for deflecting the electron beam deflected by said deflecting electrodes such that the electron beam is not sampled during a flyback period of said deflecting electrodes.

15. The optical waveform observing apparatus of claim 10, wherein the output data of said streak tube is in analog form; and said integration means comprises an integration type amplifier circuit.

16. The optical waveform observing apparatus of claim 15 further including:

photomultiplying means, responsive to a luminance distribution generated by said streak tube and corresponding to the sampled electron beam, for providing the streak tube data as an electrical output current;

said integration type amplifier circuit being coupled to receive and integrate said output current for a third time period to provide the integration of streak tube data as a corresponding output voltage;

analog-to-digital conversion means for converting said output current into a digital integration of said streak tube data; and wherein said subtraction means subtracts the digital integrations of said streak tube data for said first and second time periods.

17. The optical waveform observing apparatus of claim 10, further including display means for displaying a result of subtracting the integration of streak tube data for the first and second time periods.

18. The optical waveform observing apparatus of claim 10, further including trigger means, coupled to receive said electrical trigger signal, for counting a number of occurrences of said electrical trigger signal and determining a repetitive frequency thereof; and said control means being coupled to receive from said trigger means as count data the number of trigger signal occurrences and the repetitive frequency thereof, said control means determining the duration of said first time period from said count data.

* * * * *